Dec. 29, 1964  F. I. SCHLAKE, JR  3,163,303
AUTOMATIC BALE STACKER

Filed May 28, 1962  3 Sheets-Sheet 1

INVENTOR.
FRED I. SCHLAKE, JR.
BY
Kimmel & Crowell
ATTORNEYS.

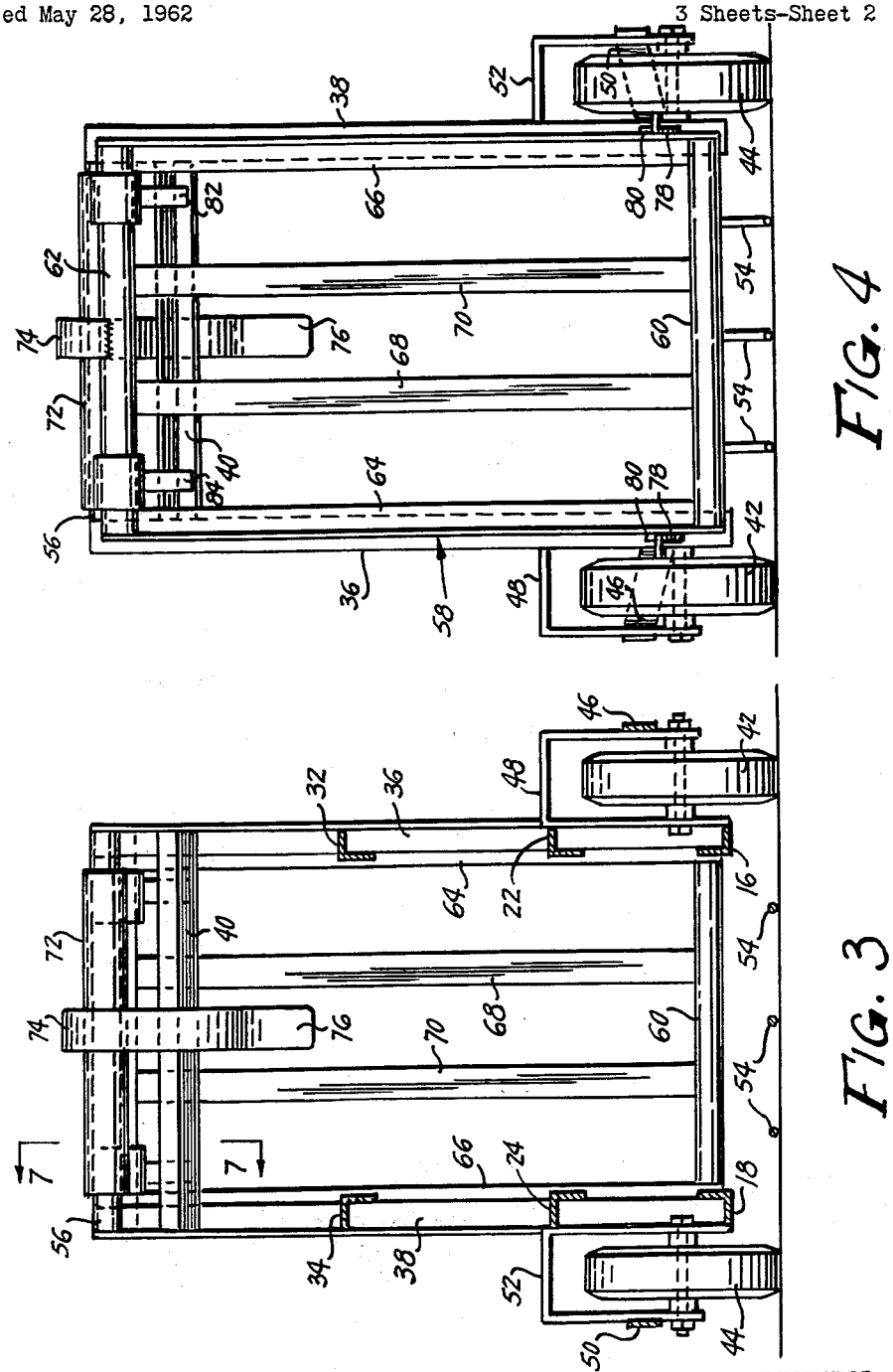

Dec. 29, 1964  F. I. SCHLAKE, JR  3,163,303
AUTOMATIC BALE STACKER
Filed May 28, 1962  3 Sheets-Sheet 3
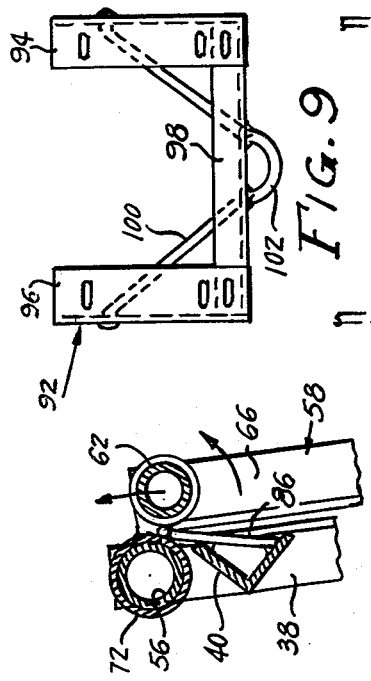
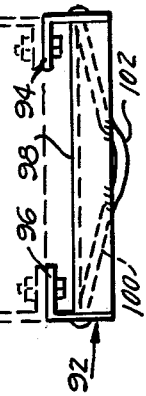
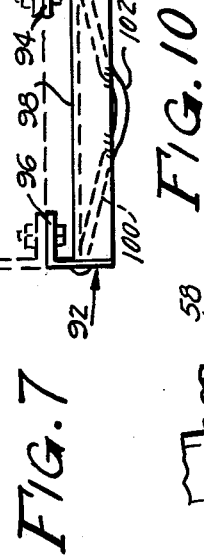
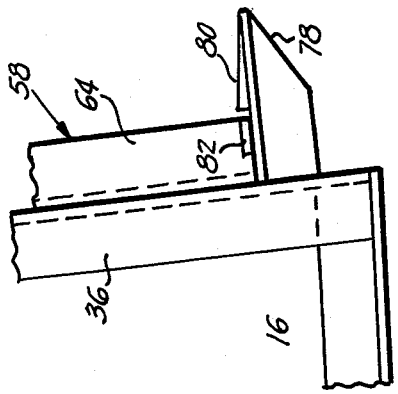
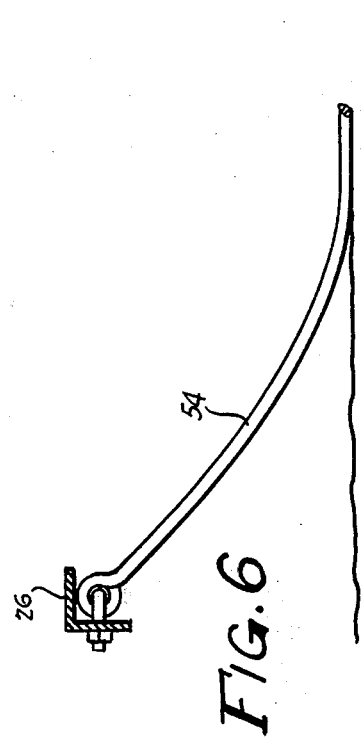
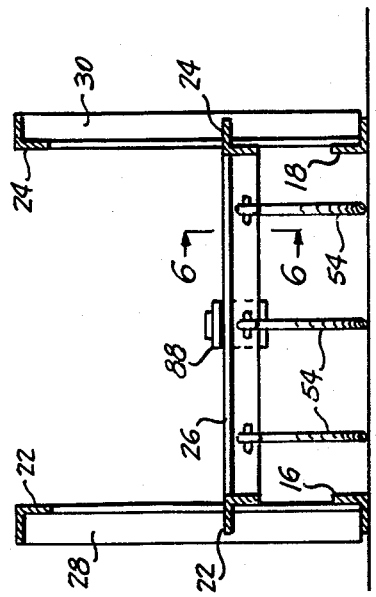
INVENTOR.
FRED I. SCHLAKE, JR.
BY
Kimmel & Crowell
ATTORNEYS.

United States Patent Office 3,163,303
Patented Dec. 29, 1964

3,163,303
AUTOMATIC BALE STACKER
Fred I. Schlake, Jr., Big Springs, Nebr.
Filed May 28, 1962, Ser. No. 198,027
4 Claims. (Cl. 214—6)

The present invention relates to a bale stacker and more particularly to a stacker for hay bales of the type which is attached to and drawn by a hay baler and adapted to receive bales delivered by the baler and automatically deposit the same on the ground in groups without the assistance of an operator or the addition of an outside source of power.

An object of the invention is a bale stacker having means to connect the same to a hay baler and adapted to receive stacked rows of bales of hay discharged from the rear of the hay baler.

Another object of the invention is a bale stacker having gate means pivotally mounted at the rear end thereof to hold hay bales in the stacker until two stacked rows of hay bales have been received therein from the hay baler.

Another object of the invention is a bale stacker having means on the pivoted gate engageable by a second row of hay bales to cause pivotal movement of the gate whereby the stacked bales will be released from the stacker and deposited on the ground as a group.

Another object of the invention is a hay baler having novel support means for a first row of hay bales received therein from the discharge end of a hay baler.

Other objects and advantages of the invention will become readily apparent by referring to the following detailed description when taken with the accompanying drawings wherein:

FIGURE 3 is an enlarged sectional view taken on lines 3—3 of FIGURE 1.

FIGURE 4 is an enlarged rear end view of the bale stacker taken on lines 4—4 of FIGURE 1.

FIGURE 5 is an enlarged sectional view taken on lines 5—5 of FIGURE 1.

FIGURE 6 is an enlarged fragmentary sectional view taken on lines 6—6 of FIGURE 5 illustrating the manner of attaching the hay bale supporting means to the frame of the stacker.

FIGURE 7 is an enlarged fragmentary view taken on lines 7—7 of FIGURE 3 illustrating the hinge means for the pivotally mounted gate.

FIGURE 8 is an enlarged fragmentary view illustrating one of a pair of latch means to hold the gate in an inoperative position.

FIGURE 9 is an enlarged top plan view of the attaching means connected to the rear of a hay baler to which the bale stacker of the present invention is connected taken on lines 9—9 of FIGURE 1.

FIGURE 10 is a front elevational view of the attaching means shown in FIGURE 9.

Figure 1:
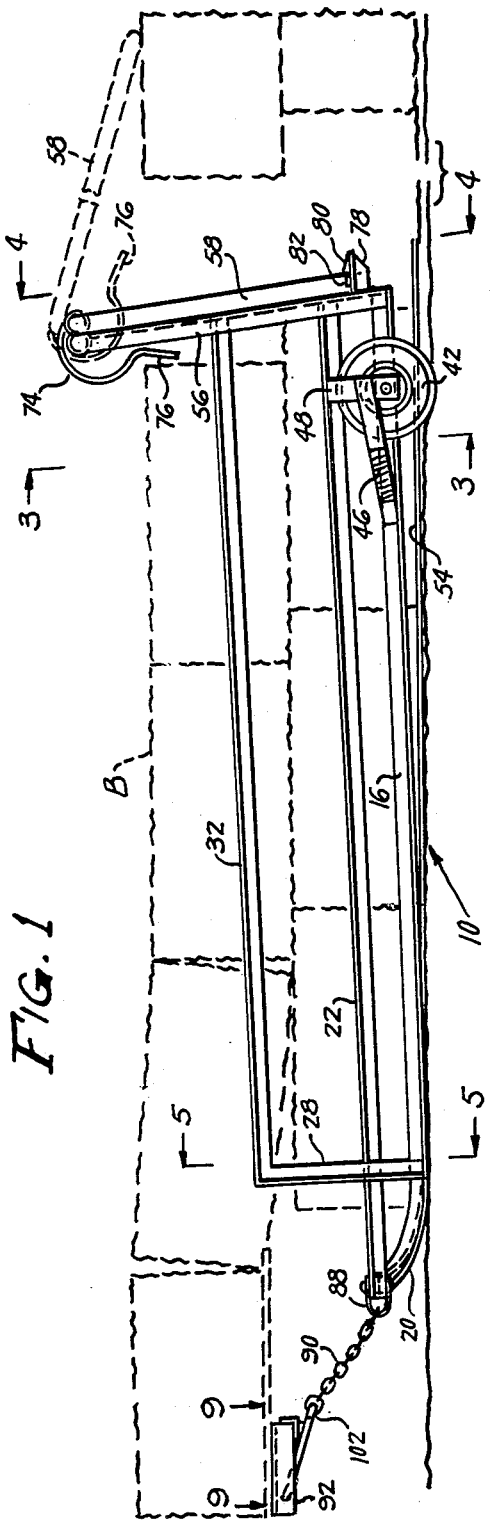
FIGURE 1 is a side elevational view of the hay baler of the present invention illustrating in dotted lines the position of stacked rows of hay bales therein and the manner in which the pivoted gate at the rear of the stacker operates to allow the hay bales to be discharged in a group.
Figure 2:
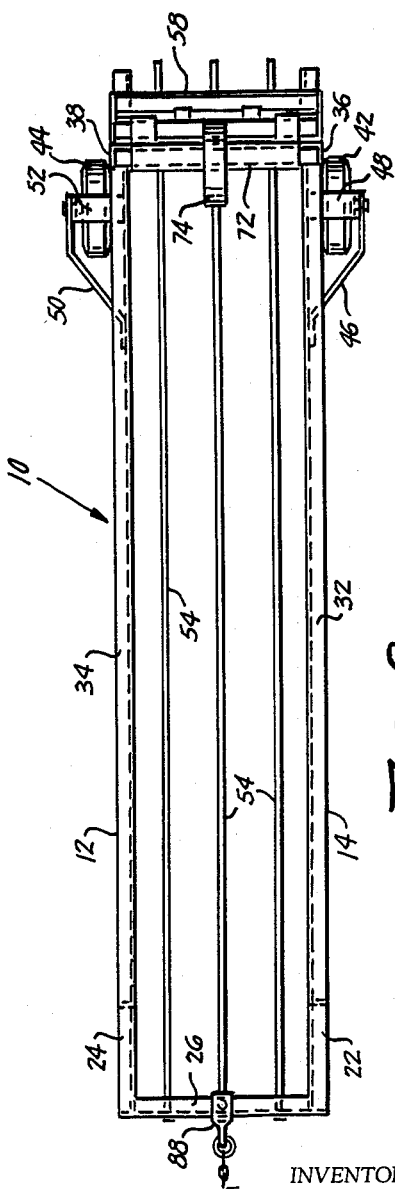
FIGURE 2 is a top plan view of the bale stacker shown in FIGURE 1.

Referring now to the drawing in detail, the bale stacker of the present invention is generally indicated by the reference numeral 10. As shown, the bale stacker 10 comprises an elongated frame including a pair of spaced side assemblies 12 and 14 which are spaced a distance apart slightly greater than the width of a bale of hay so that the bale of hay may readily fit between the side assemblies. Each of the side assemblies include longitudinally extending ground engaging runner members 16 and 18, each upwardly curved at its forward end as shown by the reference numeral 20 in FIGURE 1. Intermediate frame members 22 and 24 extend longitudinally of the stacker in vertically spaced aligned relation to the skid members 16 and 18. Intermediate frame members 22 and 24 are each connected at their forward ends to skid members 16 and 18 and secured in horizontally spaced relation by transversely extending angle member 26 secured between the forward ends thereof. Secured to skid member 16 and intermediate frame member 22 is a vertically extending angle bar 28 which is horizontally aligned with vertically extending angle bar 30 secured to skid member 18 and intermediate frame member 24. Secured to the upper free end of each of the vertical angle members 28 and 30 are parallel longitudinally extending frame members 32 and 34 disposed at a height greater than the height of a single bale of hay as delivered onto the support member 54 from the hay baler and less than the height of two bales piled one on the other. The frame members 32 and 34 terminate in substantially vertically aligned relation to the ends of skid members 16 and 18 and intermediate frame members 22 and 24. Secured to the free end of each of the skid members 16, intermediate frame member 22, and frame member 32 is a vertically extending angle bar 36 which is aligned with vertically extending angle bar 38 secured to the free end of skid member 18, intermediate frame member 24, and frame member 34. A transversely extending horizontally disposed angle member 40 is secured to the vertical angle bars 36 and 38 adjacent the upper free ends thereof. A pair of ground engaging wheels 42 and 44 are mounted at the rear of the bale stacker frame on axles mounted in brackets 46, 48, and 50 and 52, which are secured to skid members 16 and intermediate frame member 22 and skid member 18 and intermediate frame member 24, respectively.

Secured to the transversely extending angle bar 26 are a plurality of elongated rod members 54 upon which hay bales from the hay baler are supported during the ground traversing movement of the bale stacker 10.

Secured to and extending between the upper ends of each of the vertically extending angle members 36 and 38 is a tubular hinge pin 56 on which a gate 58 is pivotally mounted. The gate 58 comprises a generally rectangular frame including upper and lower cross members 60 and 62 and side frame members 64 and 66. Intermediate the side members 64 and 66 are vertically extending elongated bars 68 and 70 which are secured at their upper and lower ends to members 62 and 60, respectively. Member 62 is generally tubular in configuration and to the same is secured portions of hinge 72 which pivotally mount gate 58 on tubular member 56 extending between vertical members 36 and 38.

Fixed to cross member 62 of the pivoted gate 58 is an operating lever 74, the function of which will be described later. As shown, the operating lever is connected by one end intermediate the ends of the cross member 62 of gate 58 and is arcuately curved around the hinge 72 and includes a downwardly extending portion 76 which lies in the path of hay bales forming a second row which are received from the hay baler to which the bale stacker 10 is connected. The gate 58 is normally in the position shown in FIGURE 1, in full lines, and is retained in that position by means of a pair of latch members 78 fixed to the lower ends of vertically extending angle members 36 and 38. Only one of the latch members 78 is shown. The latch member 78 includes portions 80 against which latches 82 on side pieces 64 and 66 of the gate 58 engage to maintain the gate 58 in the position shown in full line in FIGURE 1. Details of one of the latch members 78 and latches 82 are shown in FIGURE 8. Movement of the gate 58 to the closed position shown in full line in FIGURE 1 is limited by means of stop members 84 and 86 which are welded to angle member 40 and engage hinge 72.

Secured to the transversely extending angle bar member 26 at the forward end of the bale stacker 10 is a connecting link 88 which is flexibly connected by means of chain 90 to an attaching member 92 fixed to the rear end portion of a hay baler, not shown. The attaching member 92 is shown in detail in FIGURES 9 and 10 and it comprises a pair of spaced parallel angle bar members 94 and 96 connected by means of transversely extending angle bar member 98. Secured, as by welding, to the angle bar members 94 and 96 is a yoke 100 having a bight portion 102 to which one end of a flexible chain 90 is secured. The other end of the chain 90 is secured to the link 88 as shown in FIGURE 1.

In the operation of the subject invention, the bale buncher 10 is connected to a travelling rear delivery hay baler by means of flexible chain 90 connected at one end to link 88 and at its other end to the attaching member 92 fixed to the baler, not shown. As the hay bales leave the rear of the hay baler, they are deposited in the bale stacker 10 on the elongated rods 54 between the frame assemblies 12 and 14. The baler 10 as shown in FIGURE 1 is of a size to accommodate six bales, three being accommodated on a first or lower row as shown by dotted lines and three additional being deposited in stacked relation on the first row which rests upon the elongated rods 54. The bales are indicated by the reference letter B in FIGURE 1. The first bale when deposited onto the bale stacker 10 is supported as previously mentioned on the elongated rod members 54. However, the bale also is engaged by the stubble of the cut hay and as the bale stacker 10 is moved with the hay baler, the bale of hay is received thereon and resting on the elongated rods 54 is held more or less stationary by its engagement with the stubble of the cut hay. The bale stacker 10 moves relative to the hay bale until such time as the first bale deposited therein abuts the end gate 58, at which time the same will be drawn along with the bale stacker 10. The second and third bales received in the bale stacker 10 will also engage the stubble in addition to resting on the elongated rods 54. The stacker 10 continues to move while the second and third bales are more or less stationary until the same abut the previously deposited bale, at which time they too will be drawn along with the bale stacker 10. The end gate 58 will be held against pivotal movement by means of the latching members 78 and latches 82. A second row of hay bales will be deposited in the hay baler 10 in stacked relation to the first deposited row. The bales of the second row will be moved longitudinally of the baler 10 on top of the first row of bales held therein by the subsequent bales being discharged from the hay baler abutting the same and pushing them towards the rear of the bale stacker 10. When the first deposited bale of the second row thereof is moved to the rear end of the bale stacker 10, it will engage the downwardly extending portion 76 of the operating lever 74 which will initially cause a slight upward movement of the gate 58 to disengage the latches 82 from the latching members 78 and then be moved pivotally to the position shown in dotted lines in FIGURE 1 by virtue of the relative movement between the stacked bales of hay engaging the stubble on the ground and the movement of the baler 10. The bales will, of course, remain more or less stationary while the baler 10 is moved with the hay baler whereby the group of bales will be moved through the rear end portion of the baler 10 and be deposited as a group on the ground. When the group of hay bales has been deposited, the end gate 58 will be allowed by gravity to swing to the closed position shown in full lines in FIGURE 1 and be latched by engagement of latches 82 and latching member 78. The above-mentioned operation is repeated until all of the cut hay has been baled, grouped on the stacker 10 and deposited in groups on the ground.

While many variations and modifications may be made in the inventive concept set forth herein, it is intended that this disclosure shall be interpreted merely as illustrative, and limited only by the scope of the appended claims.

I claim:

1. A bale stacker comprising an elongated frame having a forward end and a rearward end, means on the forward end of said frame for attachment of said frame to a rear delivery hay baler, ground engaging wheels on the rearward end of said frame, said frame including spaced apart longitudinally extending support members adapted to receive thereon successively delivered bales of hay from the hay baler, each of said bales when on said support members engaging the stubble on the ground between said support members and being carried rearwardly of said frame by said stubble, a pair of spaced apart longitudinally extending frame members each disposed at a height greater than the height of a single bale when on said support members and less than the height of two bales stacked one on the other, said frame members being adapted to maintain on a first row of bales received from the baler a second row of bales in stacked relation, a pair of spaced upright bars rising from the rearward end of said frame, the upper ends of said bars being spaced above said frame members, a gate extending in an upward direction adjacent and rearwardly of said bars, means connecting the upper end of said gate to said bars for swinging movement of said gate from the upper direction position to a substantially horizontal position projecting rearwardly of said frame, an upstanding lever disposed adjacent to and below the upper end of said gate on the side of said gate contiguous to said frame members, said lever having the upper end thereof secured to said gate and having the portion adjacent the lower end in the path of movement of the upper bale in a stack of two bales when on said support members, said upper bale being operable upon delivery of a further bale to the stack to engage said lever and effect swinging movement of said gate to the horizontal position and with forward movement of said frame remain on the ground surface in the stacked condition with said gate passing over said stack and by the force of gravity returning to the upward direction position.

2. A bale stacker comprising an elongated frame having a forward end and a rearward end, means on the forward end of said frame for attachment of said frame to a rear delivery hay baler, ground engaging wheels on the rearward end of said frame, said frame including spaced apart longitudinally extending support members adapted to receive thereon successively delivered bales of hay from the hay baler, each of said bales when on said support members engaging the stubble on the ground between said support members and being carried rearwardly of said frame by said stubble, a pair of spaced apart longitudinally extending frame members each disposed at a height greater than the height of a single bale when on said support members and less than the height of two bales stacked one on the other, said frame members being adapted to maintain on a first row of bales received from the baler a second row of bales in stacked relation, a pair of spaced upright bars rising from the rearward end of said frame, the upper ends of said bars being spaced above said frame members, a transversely disposed bar secured to the upper ends of said upright bars, a gate extending in an upward direction adjacent to and rearwardly of said upright bars and having the upper end connected to said transverse bar for a swinging movement of said gate from the upper direction position to a substantially horizontal position projecting rearwardly of said frame, an upstanding lever disposed adjacent to and below the upper end of said gate on the side of said gate contiguous to said frame members, said lever having the upper end thereof secured to said gate and having the portion adjacent the lower end in the path of movement of the upper bale in a stack of two bales when on said support members, said upper bale being operable upon delivery of a further bale to the stack to engage said lever and effect swinging movement of said gate to the horizontal position and with forward movement of said frame remain on the ground surface in the stacked condition with said gate passing over said stack and by the force of gravity returning to the upward direction position.

3. The apparatus according to claim 2 together with interengaging releasable latch means on said gate and said frame for releasably holding said gate in the upward direction position.

4. The apparatus according to claim 2 in which said frame includes a transversely extending bar disposed adjacent the forward end of said frame, and means on said bar to which said support members are secured.

References Cited by the Examiner
UNITED STATES PATENTS

| | | | |
|---|---|---|---|
| 2,649,982 | 8/53 | Ray | 56—473.5 |
| 2,736,159 | 2/56 | Marshall | 56—475 |
| 2,971,318 | 2/61 | Solem et al. | 56—475 |

HUGO O. SCHULZ, *Primary Examiner.*
MORRIS TEMIN, *Examiner.*